(12) United States Patent
Inamura et al.

(10) Patent No.: US 6,585,272 B2
(45) Date of Patent: Jul. 1, 2003

(54) CYLINDER HEAD GASKET WITH DIFFERENT SEAL COATINGS

(75) Inventors: Susumu Inamura, Utsunomiya (JP); Yutaka Kato, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 09/901,703

(22) Filed: Jul. 11, 2001

(65) Prior Publication Data

US 2003/0006565 A1 Jan. 9, 2003

(30) Foreign Application Priority Data

Jul. 8, 2000 (JP) .................................... 2000-238751

(51) Int. Cl.[7] .............................................. F02F 11/00
(52) U.S. Cl. ........................ 277/592; 277/593; 277/596
(58) Field of Search .................................. 277/592, 593, 277/596, 611, 612, 638, 639

(56) References Cited

U.S. PATENT DOCUMENTS

| | | | | |
|---|---|---|---|---|
| 1,815,601 A | * | 7/1931 | Victor | 277/592 |
| 4,721,315 A | * | 1/1988 | Ueta | 277/235 B |
| 5,150,910 A | * | 9/1992 | Udagawa | 277/235 B |
| 5,393,076 A | * | 2/1995 | Hagiwara et al. | 277/235 A |
| 5,431,418 A | * | 7/1995 | Hagiwara et al. | 277/235 B |
| 5,713,580 A | * | 2/1998 | Ueta | 277/180 |
| 5,769,430 A | * | 6/1998 | Udagawa | 277/592 |
| 5,879,012 A | * | 3/1999 | Udagawa | 277/595 |
| 5,893,566 A | * | 4/1999 | Miyaoh et al. | 277/592 |
| 5,938,208 A | * | 8/1999 | Yoshida et al. | 277/592 |
| 6,062,572 A | * | 5/2000 | Hasegawa et al. | 277/592 |
| 6,105,971 A | * | 8/2000 | Hasegawa | 277/593 |
| 6,328,313 B1 | * | 12/2001 | Teranishi et al. | 277/592 |
| 6,349,945 B1 | * | 2/2002 | Schumacker et al. | 277/592 |

* cited by examiner

*Primary Examiner*—William L. Miller
*Assistant Examiner*—Carlos Lugo
(74) *Attorney, Agent, or Firm*—Kaensaka & Takeuchi (57) ABSTRACT

A cylinder head gasket is used for an internal combustion engine with at least three cylinder bores. The gasket is formed of a metal plate extending substantially throughout an entire area to be sealed, and a reinforce coating. The metal plate includes two end holes, at least one inner hole sandwiched between the two end holes, and beads surrounding the respective holes. The two end holes and at least one inner hole are arranged linearly to correspond to the cylinder bores of the engine. The reinforce coating is deposited around the peripheral portion of the at least one inner hole so that sealing pressures are formed substantially equally around the two end holes and at least one inner hole. Other reinforce coatings may be deposited around the peripheral portions of the end holes.

5 Claims, 5 Drawing Sheets

CYLINDER HEAD GASKET WITH DIFFERENT SEAL COATINGS

BACKGROUND OF THE INVENTION AND RELATED ART STATEMENT

The present invention relates to a cylinder head gasket with different seal or reinforce coatings. In particular, in tightening the bolts when assembling the engine, the difference between the sealing pressure formed around the hole for the outer cylinder bore and that formed around the hole for the inner cylinder bore is made small to improve the sealing characteristic around the holes for the cylinder bores.

Figure 7:
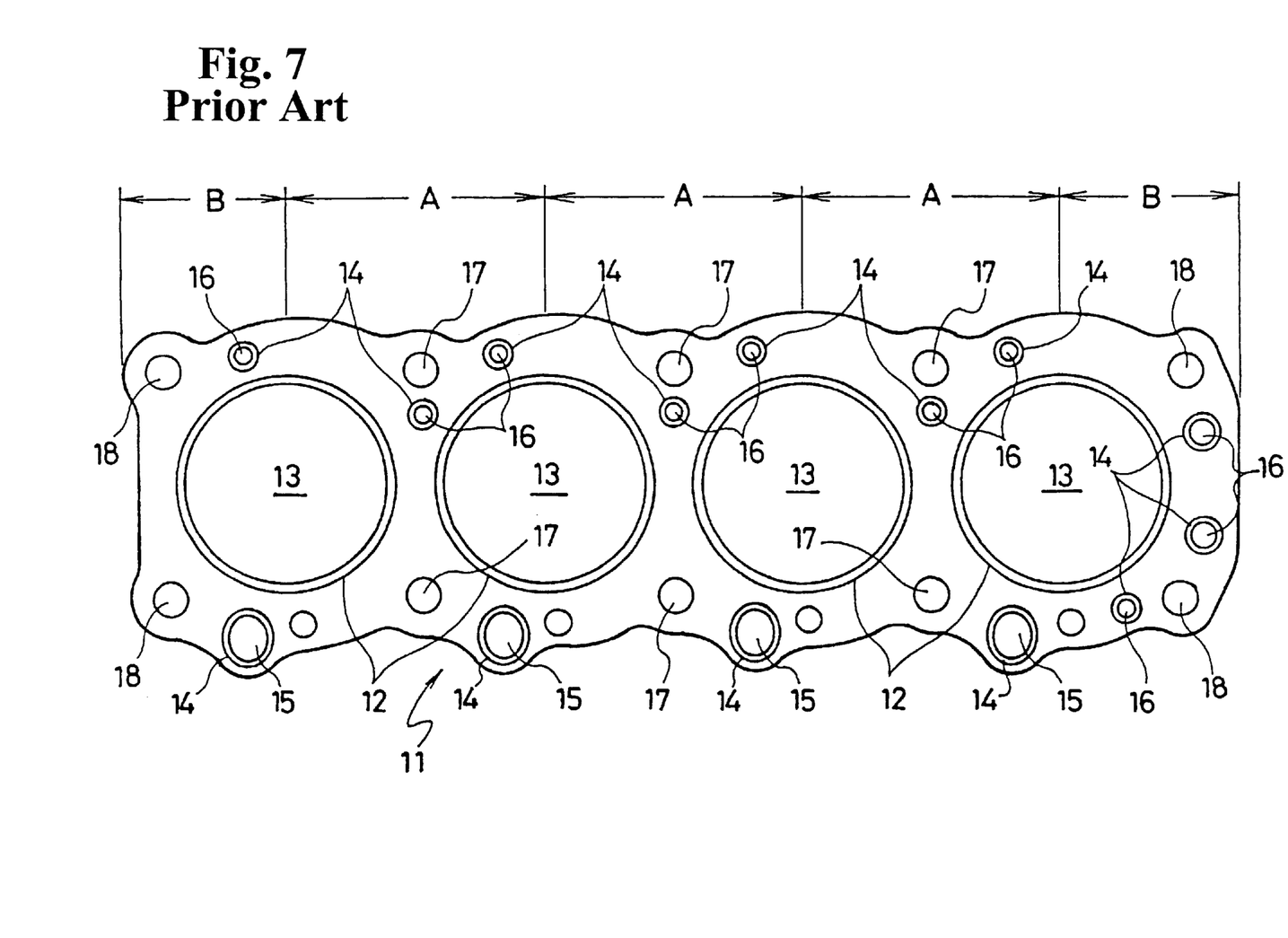
FIG. 7 is a plan view of a conventional cylinder head gasket.

As shown in FIG. 7, a cylinder head gasket 11 with a plurality of holes for the cylinder bores for sealing between a cylinder head and a cylinder block includes holes 13 for the cylinder bores, oil holes 15, water holes 16, and bolt holes 17, 18. Also, in order to seal combustion gases generated in the combustion chambers, oil circulating through an oil gallery and water in a water jacket, the gasket 11 includes sealing means, such as beads 12 and seal rings 14, for providing adequate sealing pressures to the respective holes to be sealed.

Especially, since high temperature and high pressure combustion gases are generated around the holes 13 for the cylinder bores when the engine is operated, sealings around the holes 13 are especially important. Therefore, a metal plate superior in mechanical strength and durability is used for the gasket, and beads 12 for forming main sealing portions are arranged around the holes 13 for the cylinder bores to obtain high sealing characteristics by the beads 12.

Also, in the bolt holes 17, 18, head bolts (not shown) are inserted, and the gasket is sandwiched between the cylinder head and the cylinder block (not shown) and is tightened by the head bolts. The bolt holes 17, 18 are arranged to surround the holes 13 for the cylinder bores to securely seal around the cylinder bores.

Incidentally, the tightening pressures by the head bolts passing through the bolt holes 17 are applied to the areas or ranges A in FIG. 7, while the tightening pressures by the head bolts passing through the bolt holes 18 are applied to the areas B in FIG. 7. The surface pressures are formed by tightening the head bolts.

In case the cylinder head gasket 11 in the prior art is installed between the cylinder head and the cylinder block, in case the sealing pressures by the tightening forces of the bolts are too weak, the function for sealing the combustion gas can not be sufficiently obtained. On the other hand, in case the sealing pressures by the tightening forces of the bolts are too strong, it causes the damages to the beads or creep relaxation to the beads. Thus, the sealing characteristics of the beads can not be maintained for a long period of time. Therefore, it is required to tighten the bolts at adequate tightening pressures, so that the sealing pressures generated by the tightening pressures of the bolts can provide sufficient sealing characteristics for a long time.

For this purpose, when the cylinder head gasket 11 is installed on the cylinder block together with the cylinder head, the bolts are tightened according to the predetermined order. In addition, in order to provide the equal tightening torque to the bolts, the bolts are tightened by a torque wrench.

In the gasket 11 as shown in FIG. 7, the sealing area B to which the tightening forces of the bolts passing through the bolt holes 18 are applied in a very small as compared to the area A to which the tightening forces of the bolts passing through the bolt holes 17 are applied. Therefore, the surface pressures acted on the area A become very small relative to the surface pressures acted on the area B, so that the beads 12 in the areas B are subjected to strong tightening pressures more than necessity. Thus, the equal tightening pressures are not obtained at the gasket 11 to thereby cause the problems such that the cylinder head is slightly curved like an arch to deform the lower surface thereof and to lower the sealing ability.

In this gasket, while the engine is operated, unequal pressures are applied to the beads. Therefore, the beads are likely to creep.

In case the tightening torque for the bolts passing through the bolt holes 18 at both end areas of the gasket 11 is made less than that for the bolts passing through the bolt holes 17 at the middle area, the surface pressure formed may be made equal. However, in this case, the sealing pressures are insufficient as a whole, so that the sufficient sealing characteristics are not obtained.

In order to solve the problems, in Japanese Utility Model Publications No 6-32828 and No. 6-32829, there are formed auxiliary beads or shims at the peripheries of the holes for the cylinder bores located at both end areas of the gasket. When the head bolts are tightened at the equal tightening torque, even if the sealing areas to which the tightening forces of the head bolts are applied are different, the sealing pressures are made equal. In this case, the sufficient surface pressures are obtained while the deformation of the cylinder head is prevented.

The auxiliary beads and shims disperse large sealing surface pressures applied to the beads as the main sealing at the two end areas of the gasket. As a result, since the heights of the compressed beads become substantially equal for the whole holes for the cylinder bores in the condition that the gasket is held between the cylinder head and the cylinder block, the deformation or warp of the cylinder head abutting against the cylinder head gasket in the compressed condition is suppressed.

However, since the auxiliary bead and shim operate to disperse the sealing surface pressures, the sealing surface pressures formed around the holes for the cylinder bores at the end areas and the sealing surface pressures formed around the holes for the cylinder bores at the middle area are not equalized. By increasing the sealing surface pressures around the holes for the cylinder bores at the end areas, the sufficient sealing surface pressures are obtained at the hole for the cylinder bore located in the middle area.

As a result, a large tightening force is required. In case the cylinder head and cylinder block are formed of aluminum alloy for reducing the weight of the engine, when the cylinder head and the cylinder block receive the large tightening force, the cylinder head and the cylinder block are likely to receive damages.

Also, when an auxiliary bead or shim is formed, since the auxiliary bead or shim is arranged inside or outside the main bead, it requires a space for the auxiliary bead or shim. Since the head gasket is made smaller as the engine is made smaller, it is difficult to dispose the auxiliary bead or shim in layout.

In case the shims are used, very thin shims must be processed precisely, and attached to or disposed on a plate for the cylinder head gasket. Therefore, it requires labor and cost in processing and storing the shims to increase the manufacturing cost.

On the other hand, a material, such as plastics with heat and pressure resistance properties, is coated on a part of a bead by screen printing and the like to provide surface pressure reinforcing coating to reinforce and increase the surface pressure of the bead. This processing can prevent damage of the cylinder head formed of the relatively soft aluminum alloy.

The present invention has been made to obviate these problems, and an object of the invention is to provide a cylinder head gasket, wherein the surface pressure around the hole for the cylinder bore where the surface pressure is reduced can be reinforced at a relatively small tightening pressure.

Another object of the invention is to provide a cylinder head gasket as stated above, wherein the surface pressures around the cylinder bores can be made substantially equally.

Further objects and advantages of the invention are apparent from the following description of the invention.

SUMMARY OF THE INVENTION

A cylinder head gasket of the invention is used for an internal combustion engine with at least three cylinder bores. The gasket is formed of a first metal plate extending substantially throughout an entire area to be sealed, and a first reinforce coating. The first metal plate includes two end holes, at least one inner hole sandwiched between the two end holes, and beads surrounding the respective holes. The two end holes and at least one inner hole are arranged linearly to correspond to the cylinder bores of the engine, and have peripheral portion around the holes. The first reinforce coating is deposited around the peripheral portion of the at least one inner hole so that sealing pressures are formed substantially equally around the two end holes and at least one inner hole.

The cylinder head gasket may further includes second reinforce coatings deposited around the peripheral portions of the two end holes. In this case, the thickness of the first reinforce coating is greater than that of the second reinforce coating.

The reinforce coatings may be selected from the group consisting of epoxy resin, phenol resin, phenoxy resin, fluoroplastics and polyamideimido. A desired shape of the reinforce coating may be applied by screen printing or spraying with a mask. In case the first and second reinforce co tings are formed, the reinforce coatings may have one layer with different thicknesses or a plurality of layers to change the thickness by changing the number of layers. Especially, phenoxy resin has heat resistance over 200° C., and in view of working ability and coating characteristics, phenoxy resin is most preferable.

In the cylinder head gasket with more than three holes for the cylinder bores arranged linearly, since the reinfore coating is formed thick or formed only around the peripheral portion of the inner hole for the cylinder bore where the tightening pressure is relatively low, the surface sealing pressure can be formed at the peripheral portion of the inner hole for the cylinder bore substantially equally to that at the peripheral portions of the end holes for the cylinder bores. Therefore, it is possible to reinforce the surface pressure for the inner hole where the sealing pressure is relatively low to improve the sealing ability.

Also, a large tightening torque is not required, and the large sealing surface pressures are not applied at the beads around the end holes. Therefore, creep relaxation and damages of the beads around the end holes are prevented to improve the durability.

Since the creep relaxation and damages of the beads can be avoided, in the condition that the gasket is installed between the cylinder block and the cylinder head, the gasket can keep the thickness equally around the all holes for the cylinder bores. Therefore, the deformation of the cylinder head abutting against the gasket in the compressed condition is suppressed.

When the reinforce coatings are made by a screen printing, even if the coatings have complicated shapes, the coatings can be made easily. Further, the thicknesss of the coatings can be changed easily by multiple printings, and the coatings with adequate thicknesses according to the portions of the gasket can be formed easily.

In the maltiple printings, the reinforce coatings can be formed in various shapes and thicknesses. Also, it is possible to provide a multiple structure with different materials.

Incidentally, the gasket of the invention may be formed of one or a plurality of metal plates. Also, in addition to the above reinforce coating, the gasket may have another coating.

In the cylinder head gasket, the first and second reinforce coatings are formed on and around the respective beads. The first and second reinforce coatings may be formed of a plurality of coating layers deposited on two sides of the first metal plate. The first and second reinforce coatings have heatproof characteristic and compressibility to strengthen surface pressures of the beads.

DETAILED DESCRIPTION OF THE PREFERRED EMBODIMENT

Now, the specific embodiments of the invention will be explained with reference to the drawings.

Figure 1:
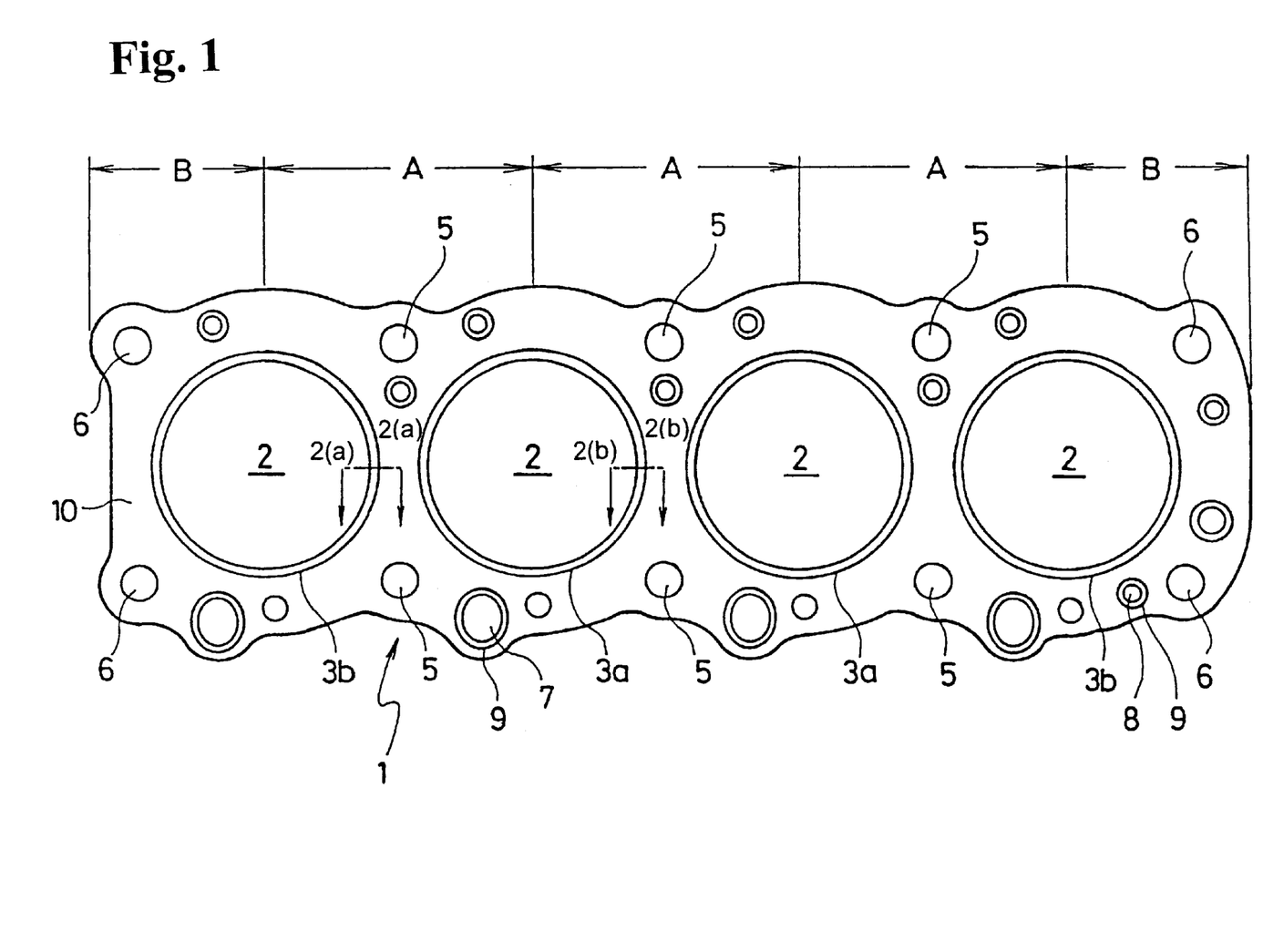
FIG. 1 is a plan view of a first embodiment of a cylinder head gasket with multiple cylinders of the invention.

As shown in FIG. 1, a cylinder head gasket 1 is made for an engine with cylinder chambers more than three to seal combustion chambers arranged linearly. The gasket 1 includes a base plate 10 having therein holes, such as holes 2 for cylinder bores, oil holes 7, water holes 8 and bolt holes 5, 6. Also, the base plate 10 includes beads 3a, 3b around the peripheries of the holes 2 for the cylinder bore as the main sealing portions, and seal rings 9 around the peripheries of the oil holes 7 and water holes 8.

In the bolt holes 5, 6, head bolts (not shown) are inserted after the cylinder head gasket is sandwiched between a cylinder head and a cylinder block (both not shown), and the bolts are tightened. The bolt holes 5, 6 are generally arranged around the holes 2 for securely sealing around the cylinder bores.

As shown in FIGS. 2(a)–5(b), surface pressure reinforce coatings 4a–4f are deposited on the peripheries around the holes 2 for the cylinder bores to cover the beads 3a, 3b forming the main sealing portions. In comparing the thicknesses of the reinforce coatings 4a–4f as a whole, the reinforce coatings around the end holes are made thin while the reinforce coatings around the inner holes are made thick.

The base plate 10 may be formed of hard metal, such as soft steel plate, stainless steel plate and spring steel plate, or ductile metal, such as cupper and aluminum.

The reinforce coatings 4a–4f are formed to have hardnesses and thicknesses such that when the reinforce coatings are compressed, the reinforcing coatings are deformed, but not damaged. The reinforce coatings may be made of epoxy resin, phenol resin, phenoxy resin, fluoroplastics or polyamideimido resin, and are applied to the desired shapes by printing, such as screen printing. In view of working ability and physical characteristics of the coating, phenoxy resin is most preferable.

In case the viscosity of the resin is low, the coating can be applied by spraying or painting. In case of printing, since the thickness of the coatings can be changed easily by multiple printings, manufacturing of the gasket can be made easily.

Also, a surface coating may be applied on the entire surface of the gasket. As the surface coating, it is preferable to have good durability and heatproof property relative to the combustion gas and liquid, i.e. oil and water, to be sealed, and also have softness and recovery ability for the compressing deformation. The material may be a rubber type material, such as NBR gum, fluorine rubber, silicone rubber, hydrogen added nitrilebutadiene rubber.

In case the rubber type material is used, since the material has elasticity, it can absorb or fill out the tool marks formed on the cylinder head and the cylinder block against which the gasket abuts.

As a resin, it is possible to use a relatively soft resin, such as epoxy resin. In case a hard resin is used, it is possible to increase a surface pressure.

Figures 2A, 2B:
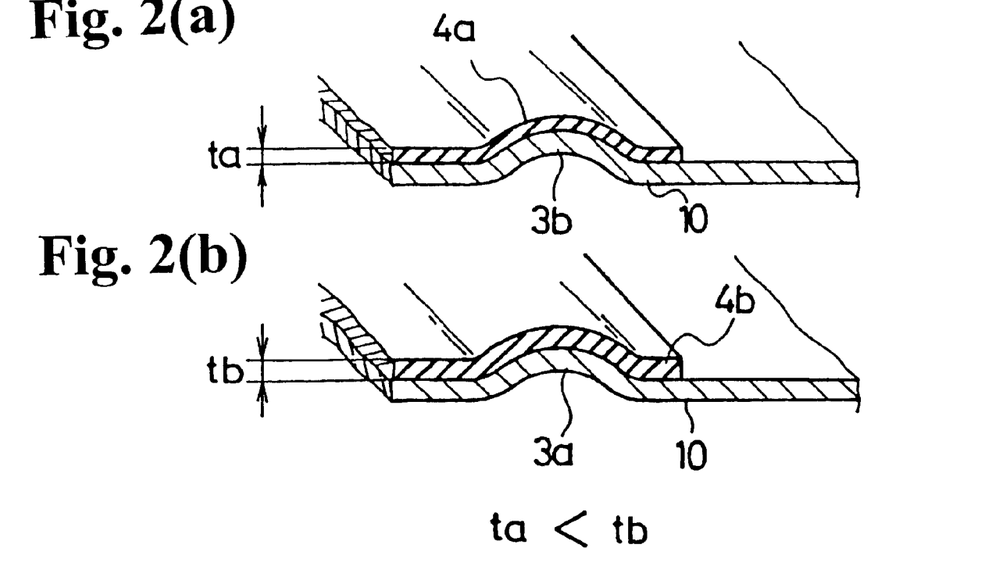
FIGS. 2(a) and 2(b) are enlarged sectional views taken along line 2(a)—2(a) and line 2(b)—2(b) in FIG. 1, respectively.

In a first embodiment as shown in FIGS. 2(a) and 2(b), the reinforce coatings 4a are formed around the holes 2 for the outer cylinder bores, and the reinforce coatings 4b are formed around the holes 2 for the inner cylinder bores. The reinforce coatings 4a, 4b are applied such that the coating 4a has a thickness ta less than the thickness tb of the coating 4b. In this case, the reinforce coatings 4a, 4b are formed of one layer, and the thicknesses are changed.

Figures 3A, 3B:
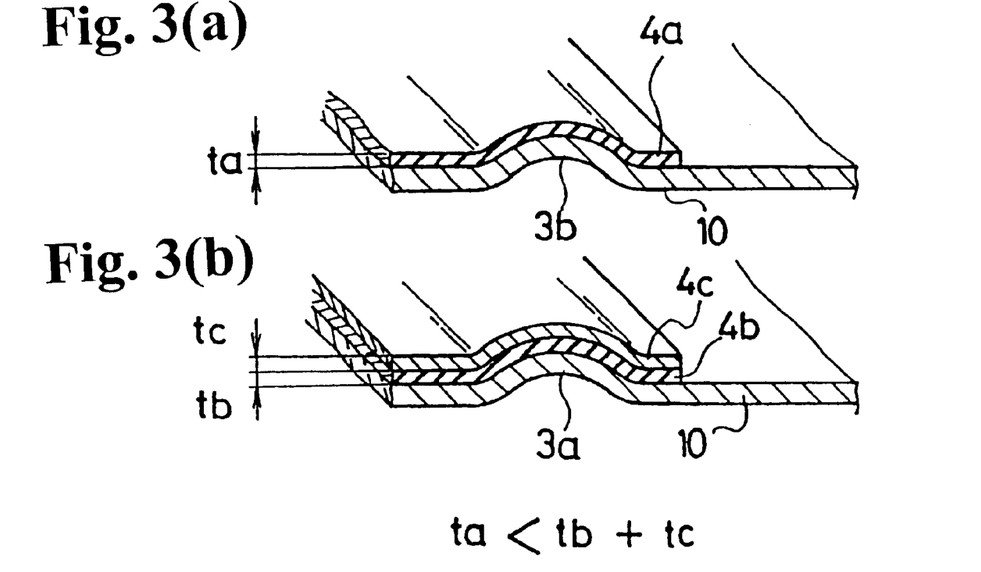
FIGS. 3(a) and 3(b) are sectional views similar to FIGS. 2(a) and 2(b), respectively, of a second embodiment of the cylinder head gasket of the invention.

In a second embodiment as shown in FIGS. 3(a) and 3(b), the coating around the outer cylinder bore is the reinforce coating 4a, while around the inner cylinder bore, two reinforce coatings 4b, 4c are formed. The total thicknesses tb+tc of the reinforce coatings 4b and 4c are greater than the thickness ta of the reinforce coating 4a at the outer cylinder bore. In this case, the reinforce coatings 4a, 4b are formed simultaneously to have the same thicknesses ta and tb, and the reinforce coating 4c with the thickness tc is laminated on the reinforce coating 4b. As a result, the coatings can be formed easily.

Figure 4A:
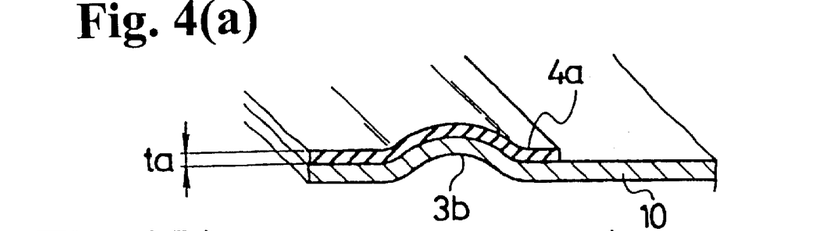
FIGS. 4(a) and 4(b) are sectional views similar to FIGS. 2(a) and 2(b), respectively, of a third embodiment of the cylinder head gasket of the invention.
Figure 4B:
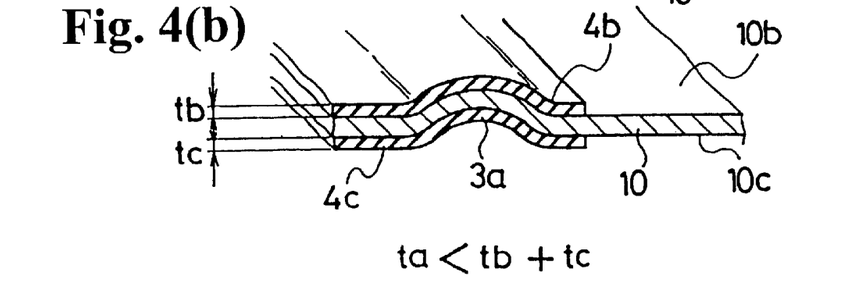

In a third embodiment as shown in FIGS. 4(a) and 4(b), the reinforce coating 4a is formed at the outer cylinder bore, while two reinforce coatings 4b, 4c are formed at the inner cylinder bore by changing the surfaces that the reinforce coatings are applied. The total thicknesses tb+tc of the reinforce coatings 4b and 4c are greater than the thickness ta of the reinforce coating 4a at the outer cylinder bore. In this case, the reinforce coatings 4a, 4b are formed simultanelusly to have the same thicknesses ta and tb, and the reinforce coating 4c with the thickness tc is coated on a surface 10C different from a surface 10b where the reinforce coating 4b with the thickness tb is formed. As a result, the coatings can be formed easily.

Figure 5A:
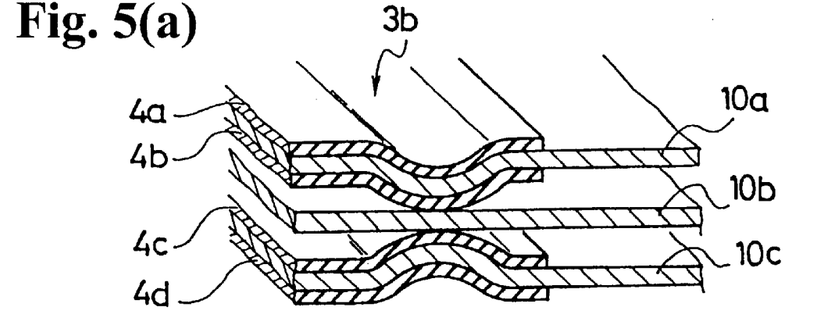
FIGS. 5(a) and 5(b) are sectional views similar to FIGS. 2(a) and 2(b), respectively, of a fourth embodiment of the cylinder head gasket of the invention.
Figure 5B:
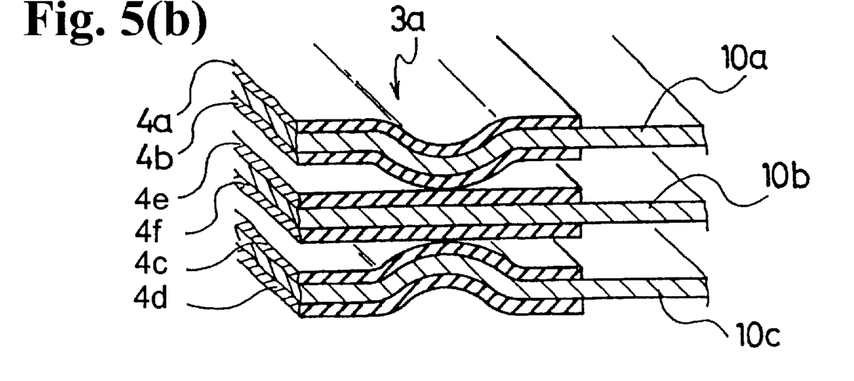

In a fourth embodiment as shown in FIGS. 5(a) and 5(b), the head gasket is formed of plates 10a, 10b, 10c. The reinforce coatings 4a–4d are formed on both surfaces of the outer plates 10a, 10c for the outer and inner cylinder bores, respectively. In regard to the inner cylinder bore, reinforce coatings 4e, 4f are formed on the plate lob, different from the plates 10a, 10c. In this case, the total thicknesses of the reinforce coatings 4a–4f around the inner cylinder bores are greater than those of the reinforce coatings 4a–4d.

Figure 6A:
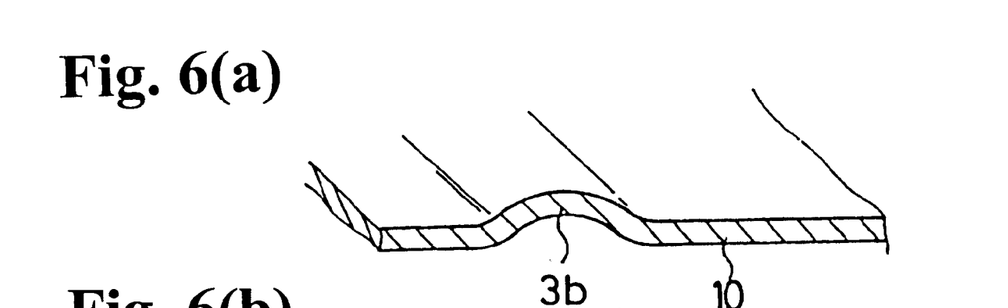
FIGS. 6(a) and 6(b) are sectional views similar to FIGS. 2(a) and 2(b), respectively, of a fifth embodiment of the cylinder head gasket of the invention.
Figure 6B:
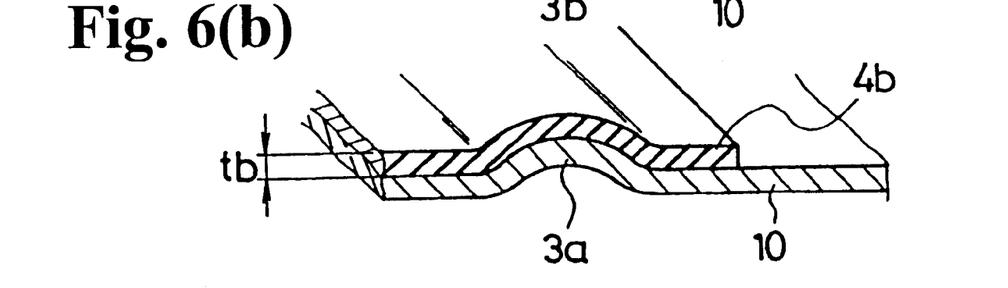

In a fifth embodiment as shown in FIGS. 6(a) and 6(b), the reinforce coatings are not formed around the outer cylinder bores, while the reinforce coating 4b is formed only around the inner cylinder bore.

In the embodiments as shown in FIGS. 2(a) to 6(b), the basic structures are shown. However, in regard to the reinforce coatings around the inner cylinder bore, it is possible to change the thickness, number of coatings, additional coating on a different surface or additional coating on a different plate, and to combine these coatings by proper selection.

Incidentally, the reinforce coatings 4a–4f are formed to have the hardness and thickness such that when the reinforce coatings are compressed, the reinforce coatings are deformed, but not damaged. The hardness and the thickness are different depending on the kind and size of the engine, but as an example, the hardness is between F and 6H in pencil hardness; the thickness of the reinforce coating 4a around the outer cylinder bore is between 5 $\mu$m and 150 $\mu$m; and the thickness of the reinforce coating 4b around the inner cylinder bore is between 10 $\mu$m and 200 $\mu$m.

In the cylinder head gasket 1 as stated above, in the engine with more than three cylinders arranged linearly, surface pressure reinforce coating is formed thick around the inner cylinder where the tightening pressure is applied relatively low, so that the surface pressure is reinforced largely. Accordingly, substantially equal sealing pressures can be formed around the holes for the outer cylinder bores and inner cylinder bore.

Namely, an area tightened by one head bolt in the area A of the inner cylinder is greater than that tightened by one bolt in the area B in the outer cylinder, so that the initial surface pressure is insufficient in the area A. Accordingly, the large loads are applied to the outer beads 3b, to thereby cause creep relaxation or damage to the outer beads 3b. Also, in the condition that the gasket 1 is installed between the cylinder head and the cylinder block, the thickness of the gasket is likely to become thin at the outer sides, so that the lower side of the cylinder head abutting against the outer sides may be deformed to increase the deformation. However, this deformation is avoided in the invention.

Therefore, it is possible to form the cylinder head gasket such that the surface pressure reinforcement may be made around the inner cylinder bore where the sealing pressure is low, to increase the sealing ability and to suppress the deformation of the cylinder head to increase the durability.

Also, the gasket does not require large tightening torque. Thus, large sealing pressures are not applied to the outer beads 3b at the outer cylinders, so that the creep relaxation and damage of the beads 3b are prevented.

In the engine with more than three cylinders arranged linearly, since the surface pressure reinforce coating is formed thick around the inner cylinder where the tightening pressure is applied relatively low, the sealing pressure at this portion is increased. Accordingly, substantially equal sealing pressures can be applied to the hole for the inner cylinder bore as in the holes for the outer cylinder bores to improve the sealing ability.

Also, since the appropriate sealing surface pressure is formed around the hole for the inner cylinder bore by the tightening force which generates the appropriate sealing surface pressure around the holes for the outer cylinder bores, a large torque is not required for tightening the bolts, and no excess sealing surface pressure is not applied around the holes for the outer cylinder bores. Thus, creep relaxation and damage of the beads can be prevented, and durability is improved.

The creep relaxation and damage of the beads are avoided, and the gasket can be maintained to have the equal thickness for all the areas around the cylinder bores in the condition that the gasket is installed between the cylinder head and the cylinder block. Therefore, the deformation of the cylinder head against which the gasket abuts is suppressed.

In comparing with an auxiliary bead and shim formed inside or outside of the bead, since the surface pressure reinforce coating can be applied above the bead, the coating can be easily applied for the gasket with a limited area.

While the invention has been explained with reference to the specific embodiments of the invention, the explanation is illustrative, and the invention is limited only by the appended claims.

What is claimed is:

1. A cylinder head gasket for an internal combustion engine with at least three cylinder bores, comprising:

a first metal plate extending substantially throughout an entire area to be sealed, said first metal plate including two end holes, at least one inner hole sandwiched between the two end holes, said two end holes and at least one inner hole being arranged linearly to correspond to the cylinder bores of the engine and having peripheral portions around the holes, and beads surrounding the respective holes, a first reinforce coating formed of upper and bottom coating layers laminated together and deposited on and around the bead at the peripheral portion of he at least one inner hole, and second reinforce coatings, each being formed of one coating layer and deposited on and around the bead at each of the peripheral portions of the two end holes, said second reinforce coatings and the bottom coating layer f the first reinforce coating being formed simultaneously to have same thickness on the first metal plate, the upper coating layer being laminated on the bottom coating layer so that the thickness of the first reinforce coating is greater than that of the second reinforce coating to thereby form sealing pressures substantially equally around the two end holes and at least one inner hole.

2. A cylinder head gasket according to claim 1, further comprising at least one second metal plate laminated with the first metal plate to constitute a metal laminate gasket.

3. A cylinder head gasket according to claim 1, wherein said first and second reinforce coatings have heatproof characteristic and compressibility to strengthen surface pressures of the beads.

4. A cylinder head gasket according to claim 3, wherein said first and second reinforce coatings are selected from the group consisting of epoxy resin, phenol resin, phenoxy resin, fluoroplastics and polyamideimido.

5. A cylinder head gasket according to claim 1, wherein said upper and bottom coating layers of the first reinforce coating have same shapes and laminated together without extending over the entire area of the first metal plate.

* * * * *

UNITED STATES PATENT AND TRADEMARK OFFICE
CERTIFICATE OF CORRECTION

PATENT NO. : 6,585,272 B2
DATED : July 1, 2003
INVENTOR(S) : Susumu Inamura et al.

It is certified that error appears in the above-identified patent and that said Letters Patent is hereby corrected as shown below:

Column 3,
Line 34, change "includes" to -- include --;
Line 44, change "co tings" to -- coatings --;

Column 5,
Line 12, change "cupper" to -- copper --;

Column 6,
Line 2, change "simultanelusly" to -- simultaneously --;
Line 4, change "to" to -- tc --, and "10C" to -- 10c --;

Column 8,
Line 8, change "he" to -- the --;
Line 15, change "f" to -- of --; and
Line 16, before "same" add -- a --.

Signed and Sealed this

Thirtieth Day of September, 2003

JAMES E. ROGAN
*Director of the United States Patent and Trademark Office*